United States Patent [19]
Apelian et al.

[11] Patent Number: 5,358,628
[45] Date of Patent: Oct. 25, 1994

[54] PRODUCTION OF HIGH VISCOSITY INDEX LUBRICANTS

[75] Inventors: Minas R. Apelian, Vincetown, N.J.; Charles L. Baker, Jr., Thornton, Pa.; Thomas F. Degnan, Moorestown, N.J.; David O. Marler, Deptford, N.J.; Dominick N. Mazzone, Wenonah, N.J.; Dennis E. Walsh, Richboro, Pa.

[73] Assignee: Mobil Oil Corporation, Fairfax, Va.

[21] Appl. No.: 898,615

[22] Filed: Jun. 15, 1992

Related U.S. Application Data

[63] Continuation-in-part of Ser. No. 548,702, Jul. 5, 1990, abandoned.

[51] Int. Cl.$^5$ ............................................. C10G 69/02
[52] U.S. Cl. ........................................ 208/60; 208/58
[58] Field of Search .................................... 208/58, 60

[56] References Cited

U.S. PATENT DOCUMENTS

| | | | |
|---|---|---|---|
| 2,817,693 | 12/1957 | Koome et al. | 260/683.9 |
| 3,365,390 | 1/1968 | Egan et al. | 208/60 |
| 3,442,795 | 5/1969 | Kerr et al. | 208/120 |
| 3,551,353 | 12/1970 | Chen et al. | 252/455 |
| 3,682,813 | 8/1972 | Dun et al. | 208/59 |
| 3,776,839 | 12/1973 | Ladeur | 208/110 |
| 3,794,580 | 2/1974 | Ladeur | 208/110 |
| 3,830,723 | 8/1974 | Ladeur et al. | 208/108 |
| 4,052,472 | 10/1977 | Givens et al. | 260/668 B |
| 4,222,855 | 9/1980 | Pelrine et al. | 208/111 |
| 4,388,177 | 6/1983 | Bowes et al. | 208/111 |
| 4,419,220 | 6/1983 | LaPierre et al. | 208/111 |
| 4,594,172 | 6/1986 | Sie | 252/55 |
| 4,672,049 | 6/1987 | Chen et al. | 502/66 |
| 4,897,178 | 1/1990 | Best et al. | 208/111 |
| 4,919,788 | 4/1990 | Chen et al. | 208/59 |
| 4,921,594 | 5/1990 | Miller | 208/58 |
| 4,975,177 | 12/1990 | Garwood | 208/27 |

FOREIGN PATENT DOCUMENTS

| | | | |
|---|---|---|---|
| 0259526B | 5/1979 | European Pat. Off. | C10G 23/02 |
| 0153782 | 4/1985 | European Pat. Off. | B01J 37/26 |
| 1121443 | 7/1968 | United Kingdom | C10G 13/02 |
| 1188447 | 4/1970 | United Kingdom | B01J 11/74 |
| 1350257 | 4/1974 | United Kingdom | C10G 23/02 |
| 1390359 | 4/1975 | United Kingdom | C10G 13/08 |
| 1429291 | 3/1976 | United Kingdom | C10G 13/20 |
| 1429494 | 3/1976 | United Kingdom | C10G 13/08 |
| 1440230 | 6/1976 | United Kingdom | C10G 34/00 |
| 1476428 | 6/1977 | United Kingdom | C10G 34/00 |
| 1545828 | 5/1979 | United Kingdom | B01J 37/26 |
| 1546504 | 5/1979 | United Kingdom | C10G 3/08 |

OTHER PUBLICATIONS

Bull, et al., "Lube Oil Manufacture by Severe Hydrotreatment", PD 19(2), 221–228.

*Primary Examiner*—Helane Myers
*Attorney, Agent, or Firm*—Alexander J. McKillop; Dennis P. Santini; Lori F. Cuomo

[57] ABSTRACT

Petroleum wax feeds are converted to high Viscosity Index lubricants by a two-step hydrocracking-hydroisomerization process in which the wax feed is initially subjected to hydrocracking under mild conditions with a conversion to non-lube range products of no more than about 30 weight percent of the feed. The hydrocracking is carried out at a hydrogen pressure of at least 1000 psig using an amorphous catalyst which preferentially removes the aromatic components present in the initial feed. The hydrocracked effluent is then subjected to hydroisomerization in a second step using a low acidity dicarboxylic acid-treated zeolite Beta or mordenite catalyst which effects a preferential isomerization on the paraffin components to less waxy, high V.I. isoparaffins. The second stage may be operated at high pressure by cascading the first stage product into the second stage or at a lower pressure, typically from 200 to 1000 psig. The second stage catalyst is preferably a noble metal containing zeolite Beta catalyst which is treated with oxalic acid to give a low Alpha Value, typically below 10. The second stage is carried out at relatively low temperature, typically from 600° to 650° F. with a 650° F.+ conversion in the range of 10 to 20 weight percent of the second stage feed but with high selectivity for isomerization of the paraffins. A final dewaxing step to target pour point may be used with relatively low loss, typically no more than 15 weight percent, during this dewaxing. The final products typically have V.I. values in excess of 130 and usually in the range of 140 to 155 and are characterized by exceptional stability.

39 Claims, 3 Drawing Sheets

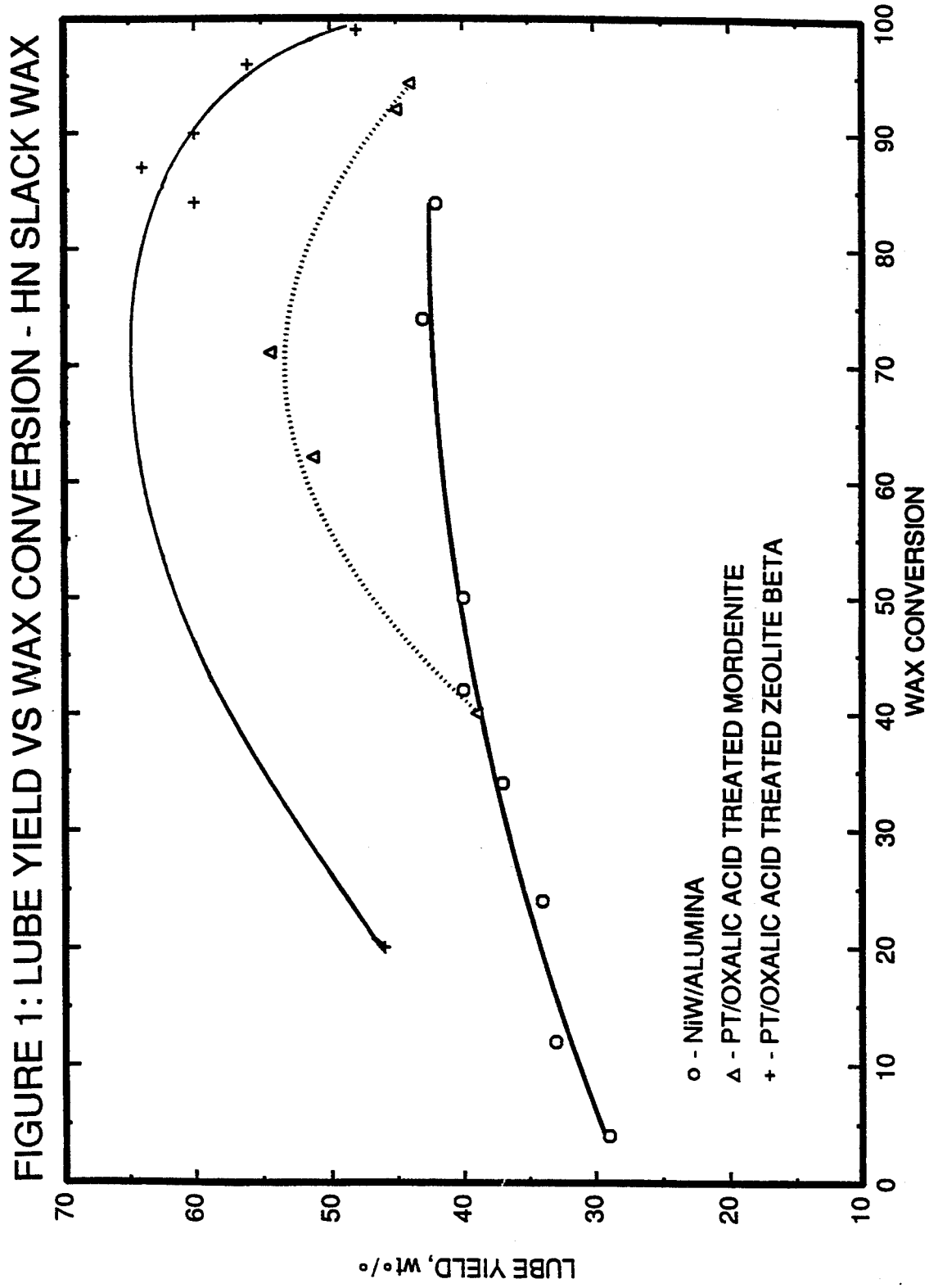

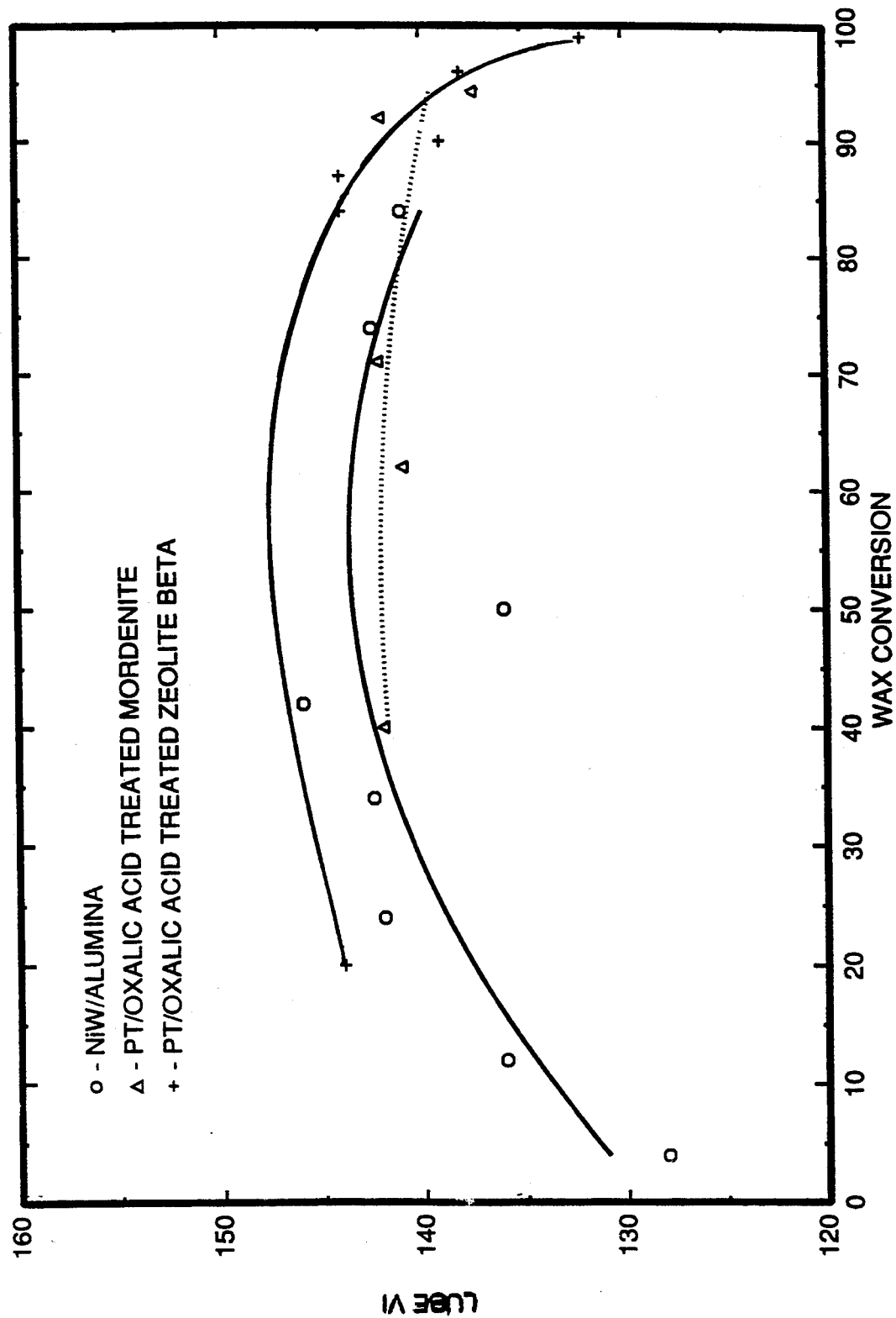

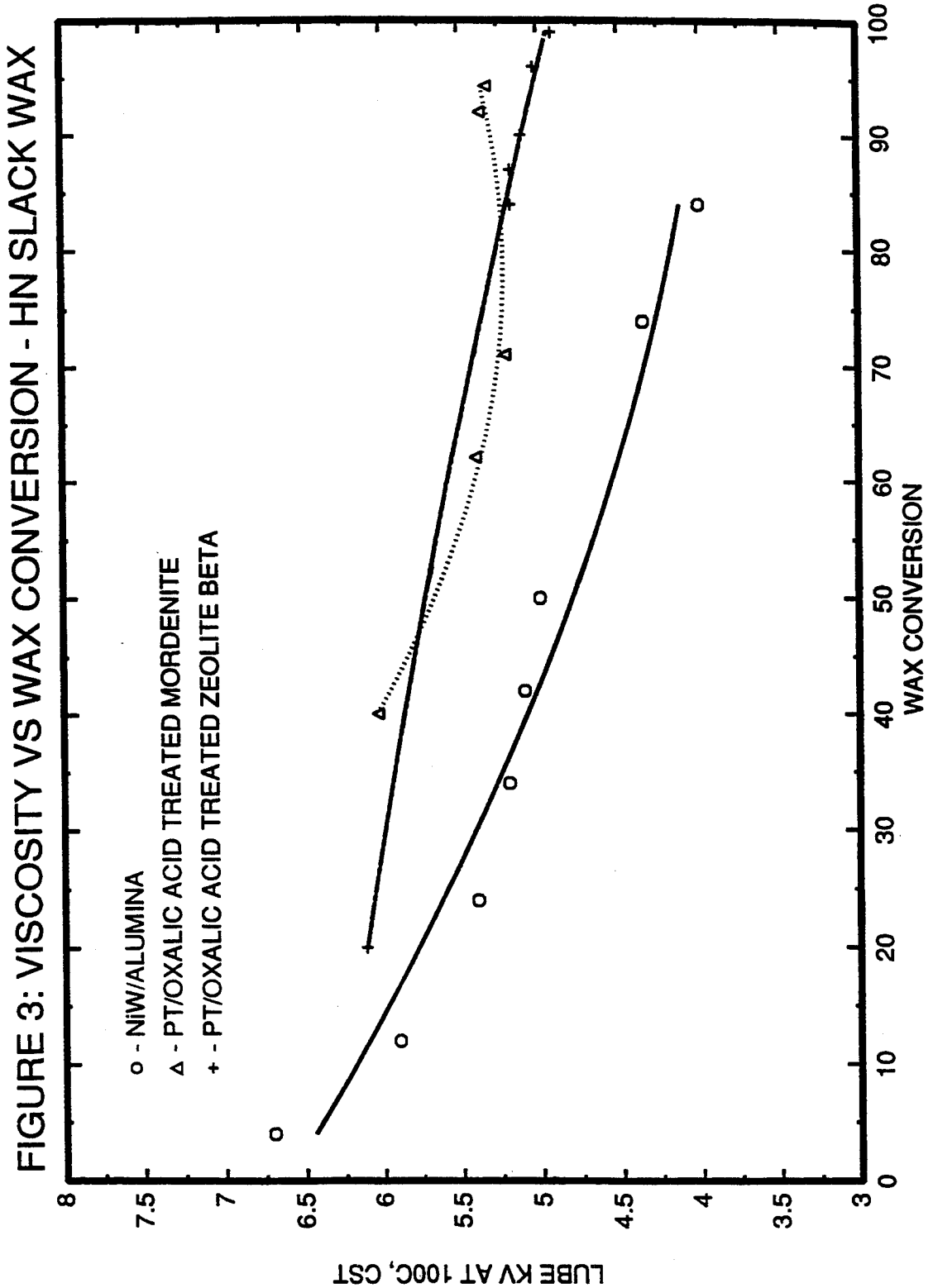

PRODUCTION OF HIGH VISCOSITY INDEX LUBRICANTS

CROSS-REFERENCE TO RELATED APPLICATIONS

This application is a continuation-in-part of U.S. application Ser. No. 07/548,702, filed Jul. 5, 1990, now abandoned. This application is related to copending U.S. Application Ser. No. 07/828,624, filed Jan. 31, 1992, and U.S. application Ser. No. 07/898,614, now U.S. Pat. No. 5,238,677.

FIELD OF THE INVENTION

This invention relates to the production of high Viscosity Index lubricants by hydrocracking mineral oil feedstocks, especially petroleum waxes.

BACKGROUND OF THE INVENTION

Mineral oil based lubricants are conventionally produced by a separative sequence carried out in the petroleum refinery which comprises fractionation of a paraffinic crude oil under atmospheric pressure followed by fractionation under vacuum to produce distillate fractions (neutral oils) and a residual fraction which, after deasphalting and severe solvent treatment may also be used as a lubricant basestock usually referred to as bright stock. Neutral oils, after solvent extraction to remove low Viscosity Index (V.I.) components are conventionally subjected to dewaxing, either by solvent or catalytic dewaxing processes, to the desired pour point, after which the dewaxed lubestock may be hydrofinished to improve stability and remove color bodies. This conventional technique relies upon the selection and use of crude stocks, usually of a paraffinic character, which produce the desired lube fractions of the desired qualities in adequate amounts. The range of permissible crude sources may, however, be extended by the lube hydrocracking process which is capable of utilizing crude stocks of marginal or poor quality, usually with a higher aromatic content than the best paraffinic crudes. The lube hydrocracking process, which is well established in the petroleum refining industry, generally comprises an initial hydrocracking step carried out under high pressure in the presence of a bifunctional catalyst which effects partial saturation and ring opening of the aromatic components which are present in the feed. The hydrocracked product is then subjected to dewaxing in order to reach the target pour point since the products from the initial hydrocracking step which are paraffinic in character include components with a relatively high pour point which need to be removed in the dewaxing step.

Current trends in the design of automotive engines are associated with higher operating temperatures as the efficiency of the engines increases and these higher operating temperatures require successively higher quality lubricants. One of the requirements is for higher viscosity indices (V.I.) in order to reduce the effects of the higher operating temperatures on the viscosity of the engine lubricants. High V.I. values have conventionally been attained by the use of V.I. improvers, e.g., polyacrylates, but V.I. improvers tend to undergo degradation under the effects of high temperatures and high shear rates encountered in the engine, the more stressing conditions encountered in high efficiency engines result in even faster degradation of oils which employ significant amounts of V.I. improvers. Thus, there is a continuing need for automotive lubricants which are based on fluids of high Viscosity Index and which are stable to the high temperature, high shear rate conditions encountered in modern engines.

Synthetic lubricants produced by the polymerization of olefins in the presence of certain catalysts have been shown to possess excellent V.I. values, but they are expensive to produce by the conventional synthetic procedures and usually require expensive starting materials. There is therefore a need for the production of high V.I. lubricants from mineral oil stocks which may be produced by techniques comparable to those presently employed in petroleum refineries.

In theory, as well as in practice, lubricants should be highly paraffinic in nature since paraffins possess the desirable combination of oxidation stability and high Viscosity Index. Normal paraffins and slightly branched paraffins e.g., n-methyl paraffins, are often waxy materials which confer an unacceptably high pour point on the lube stock and are therefore removed during the dewaxing operations in the conventional refining process described above. It is, however, possible to process waxy feeds in order to retain many of the benefits of their paraffinic character while overcoming the undesirable pour point characteristic. A severe hydrotreating process for manufacturing lube oils of high Viscosity Index is disclosed in *Developments in Lubrication* PD 19(2), 221-228, S. Bull et al., and in this process, waxy feeds such as waxy distillates, deasphalted oils and slack waxes are subjected to a two-stage hydroprocessing operation in which an initial hydrotreating unit processes the feeds in blocked operation with the first stage operating under higher temperature conditions to effect selective removal of the undesirable aromatic compounds by hydrocracking and hydrogenation. The second stage operates under relatively milder conditions of reduced temperature at which hydrogenation predominates, to adjust the total aromatic content and influence the distribution of aromatic types in the final product. The viscosity and flash point of the base oil are then controlled by topping in a subsequent redistillation step after which the pour point of the final base oil is controlled by dewaxing in a solvent dewaxing (MEK-toluene) unit. The slack waxes removed from the dewaxer may be reprocessed to produce a base oil of high Viscosity Index.

Processes of this type, employing a waxy feed which is subjected to hydrocracking over an amorphous bifunctional catalyst such as nickel-tungsten on alumina or silica-alumina are disclosed, for example, in British Patent Nos. 1,429,494; 1,429,291; and 1,493,620; and U.S. Pat. Nos. 3,830,273; 3,776,839; 3,794,580; and 3,682,813. In the process described in GB 1,429,494, a slack wax produced by the dewaxing of a waxy feed is subjected to hydrocracking over a bifunctional hydrocracking catalyst at hydrogen pressures of 2,000 psig of higher, followed by dewaxing of the hydrocracked product to obtain the desired pour point. Dewaxing is stated to be preferably carried out by the solvent process with recycle of the separated wax to the hydrocracking step.

In processes of this kind, the hydrocracking catalyst is typically a bifunctional catalyst containing a metal hydrogenation component on an amorphous acidic support. The metal component is usually a combination of base metals, with one metal selected from the iron group (Group VIII) and one metal from Group VIB of the Periodic Table, for example, nickel in combination with molybdenum or tungsten. Modifiers such as phosphorus or boron may be present, as described in GB 1,350,257; GB 1,342,499; GB 1,440,230; FR 2,123,235; FR 2,124,138; and EP 199,394. Boron may also be used as a modifier as described in GB 1,440,230. The activity of the catalyst may be increased by the use of fluorine, either by incorporation into the catalyst during its preparation in the form of a suitable fluorine compound or by in situ fluoriding during the operation of the process, as disclosed in GB 1,390,359.

Although the process using an amorphous catalyst for the treatment of the waxy feeds has shown itself to be capable of producing high V.I. lubricants, it is not without its limitations. At best, the technique requires a significant dewaxing capability, both in order to produce the feed as well as to dewax the hydrocracked product to the desired pour point. The reason for this is that although the amorphous catalysts are effective for the saturation of the aromatics under the high pressure conditions which are typically used (about 2,000 psig) their selectivity to high VI lube range components is not high. The waxy paraffins which pass through the unit therefore need to be removed during the subsequent dewaxing step and recycled, thus reducing the capacity of the unit. The restricted selectivity of the amorphous catalysts also limits the single-pass yields to a value below about 50 percent, with the corresponding wax conversion being about 30 to 60%, even though higher yields would obviously enhance the efficiency of the process. The product V.I. is also limited by the isomerization activity, typically to about 145 at 0° F. pour point in single pass operation. The temperature requirement of the amorphous catalysts is also relatively high, at least in comparison to zeolite catalysts, typically being about 700°–800° F.

Another approach to the upgrading of waxy feeds to high V.I. lubricant basestocks is disclosed in U.S. Pat. Nos. 4,919,788 and 4,975,177. In this process, a waxy feed, typically a waxy gas oil, a slack wax, or a deoiled wax, is hydroprocessed over a highly siliceous zeolite Beta catalyst. Zeolite Beta is known to be highly effective for the isomerization of paraffins in the presence of aromatics, as reported in U.S. Pat. No. 4,419,220, and its capabilities are effectively exploited in the process of U.S. Pat. Nos. 4,919,788 and 4,975,177 in a manner which optimizes the yield and viscometric properties of the products. The zeolite Beta catalyst isomerizes the high molecular weight paraffins contained in the back end of the feed to less waxy materials while minimizing cracking of these components to materials boiling outside the lube range. The waxy paraffins in the front end of the feed are removed in a subsequent dewaxing step, either solvent or catalytic, in order to achieve the target pour point. The combination of paraffin hydroisomerization with the subsequent selective dewaxing process on the front end of the feed is capable of achieving higher product V.I. values than either process on its own and, in addition, the process may be optimized either for yield efficiency or for V.I. efficiency, depending upon requirements.

Additionally, an isomerization process using a highly siliceous zeolite catalyst, including highly siliceous forms of zeolite Beta and mordenite, is disclosed in U.S. Pat. No. 4,962,269 for producing low pour point lubricating oils from highly paraffinic feedstocks.

While these zeolite-catalyzed processes have shown themselves to be highly effective for dealing with highly paraffinic feeds, the high isomerization selectivity of the highly siliceous zeolite Beta and mordenite catalysts, coupled with lesser capability to remove low quality aromatic components, has tended to limit the application of the processes to feeds which contain relatively low quantities of aromatics: the aromatics as well as other polycyclic materials are less readily attacked by the zeolite with the result that they pass through the process and remain in the product with a consequent reduction in V.I. The lube yield also tends to be constrained by the low wax isomerisation selectivity at low conversions and by wax cracking out of the lube boiling range at high conversions: maximum lube yields are typically obtained in the 20 to 30 weight percent conversion range (650° F.+ conversion). It would therefore be desirable to increase isomerization selectivity and simultaneously to reduce hydrocracking selectivity in order to improve lube yield while retaining the high V.I. numbers in the product.

In summary, therefore, the processes using amorphous catalysts can be regarded as inferior in terms of single pass conversion and overall yield because the amorphous catalysts are relatively non-selective for paraffin isomerization in the presence of polycyclic components but have a high activity for cracking so that overall yield remains low and dewaxing demands are high. The zeolite-catalyzed process, by contrast, is capable of achieving higher yields since the zeolite has a much higher selectivity for paraffin isomerization but under the moderate hydrogen pressures used in the process, the aromatics are not effectively dealt with in lower quality feeds and operation is constrained by the differing selectivity factors of the zeolite at different conversion levels.

SUMMARY OF THE INVENTION

We have now devised a process for producing high quality, high Viscosity Index (V.I.) lubricants by a two-stage wax hydrocracking-hydroisomerization process. The process is capable of producing products with very high viscosity indices, typically above about 130, usually in the range of 140 to 155 with values of 140 to 150 being typical. The process is capable of being operated with feeds of varying composition to produce high quality lube basestocks in good yield. Compared to the process using amorphous catalysts, yields are higher and the dewaxing requirement for the product is markedly lower due to the effectiveness of the process in converting the waxy paraffins, mainly linear and near linear paraffins, to less waxy isoparaffins of high Viscosity Index. Compared to the zeolite-catalyzed process, it has the advantage of being able to accommodate a wider range of feeds at constant product quality since it is more effective for the removal of the low quality aromatic components from the feed; it also provides a yield advantage in the range where maximum lube yield is obtained (about 20–30% conversion) as well as providing a higher product V.I. across a wide conversion range from about 5 to 40 percent conversion.

According to the present invention, the waxy feed is subjected to a two-stage hydrocracking-hydroisomerization. In the first stage, the feed is subjected to hydroprocessing over a bifunctional catalyst comprising a metal hydrogenation component on an amorphous acidic support under relatively mild conditions of limited conversion. The second stage comprises a hydroisomerization step which is carried out over a noble metal-containing zeolitic catalyst of low acidity. In the first stage, the low quality aromatic components of the feed are subjected to hydrocracking reactions which result in complete or partial saturation of aromatic rings accompanied by ring opening reactions to form products which are relatively more paraffinic; the limited conversion in the first stage, however, enables these products to be retained without undergoing further cracking to products boiling below the lube boiling range, typically below about 650° F. (about 345° C.). Typically, the conversion in the first stage is limited to no more than 30 weight percent of the original feed.

In the second stage, the conditions are optimized for hydroisomerization of the paraffins originally present in the feed together with the paraffins produced by hydrocracking in the first stage. For this purpose a low acidity catalyst with high isomerization selectivity is employed. Low acidity is desirable so that wax isomerization reactions are favored as compared to non-selective cracking reactions. For this purpose, a low acidity zeolite catalyst which has been modified by the use of a dicarboxylic acid treatment to reduce the acidity has been found to give excellent results. A particular acid shown to be effective is oxalic acid. Steaming may also be utilized to reduce the acidity of the zeolite catalyst to low levels. A noble metal, preferably platinum, is used to provide hydrogenation-dehydrogenation functionality in this catalyst in order to promote the desired hydroisomerization reactions.

The process may be operated in two different modes, both of which require relatively high pressures in the first stage in order to maximize removal of aromatic components in the feed and for this purpose pressures of at least 800 psig, usually from about 800 to 3,000 psig are suitable. The second stage may be operated either by cascading the first stage effluent directly into the second stage or, alternatively, by passing the first stage products through an interstage separator to remove inorganic heteroatoms. In both cases, however, the process is well suited for upgrading waxy feeds such as slack wax with oil contents less than about 50 weight percent to high Viscosity Index lubricating oils with high single pass yields and a limited requirement for product dewaxing.

BRIEF DESCRIPTION OF THE DRAWINGS

FIGS. 1, 2 and 3 are graphs illustrating the results of wax hydroprocessing experiments reported in the Examples.

DETAILED DESCRIPTION

In the present process waxy feeds are converted to high V.I. lubricants in a two-stage hydrocracking-hydroisomerization process. The products are characterized by good viscometric properties including high Viscosity Index, typically at least 130 and usually in the range 140 to 155. The two stages of the process are carried out in the presence of hydrogen using catalysts which are optimized for selective removal of the low quality aromatic components in the first stage by hydrocracking reactions and selective paraffin isomerization in the second stage to form high V.I. products.

Feed

The feed to the process comprises a petroleum wax which contains at least 50 weight percent wax, as determined by ASTM test D-3235. In these feeds of mineral oil origin, the waxes are mostly paraffins of high pour point, comprising straight chain and slightly branched chain paraffins such as methylparaffins.

Petroleum waxes, that is, waxes of paraffinic character are derived from the refining of petroleum and other liquids by physical separation from a wax-containing refinery stream, usually by chilling the stream to a temperature at which the wax separates, usually by solvent dewaxing, e.g., MEK/toluene dewaxing or by means of an autorefrigerant process such as propane dewaxing. These waxes have high initial boiling points above about 650° F. (about 345° C.) which render them extremely useful for processing into lubricants which also require an initial boiling point of at least 650° F. (about 345° C.). The presence of lower boiling components is not to be excluded since they will be removed together with products of similar boiling range produced during the processing during the separation steps which follow the characteristic processing steps. Since these components will, however, load up the process units they are preferably excluded by suitable choice of feed cut point. The end point of wax feeds derived from the solvent dewaxing of neutral oils i.e., distillate fractions produced by the vacuum distillation of long or atmospheric resids will usually be not more than about 1100° F. (about 595° C.) so that they may normally be classified as distillate rather than residual streams but high boiling wax feeds such as petrolatum waxes i.e., the waxes separated from bright stock dewaxing, which may typically have an end point of up to about 1300° F. (about 705° C.), may also be employed.

The wax content of the feed is high, generally at least 50, more usually at least 60 to 80, weight percent with the balance from occluded oil comprising iso-paraffins, aromatics and naphthenics. The non-wax content of aromatics, polynaphthenes and highly branched naphthenes will normally not exceed about 40 weight percent of the wax and preferably will not exceed 25 to 30 weight percent. The aromatic content is typically in the range of from 5 to 30 weight percent and usually in the range of from 8 to 15 weight percent. These waxy, highly paraffinic wax stocks usually have low viscosities because of their relatively low content of aromatics and naphthenes although the high content of waxy paraffins gives them melting points and pour points which render them unacceptable as lubricants without further processing.

Feeds of this type will normally be slack waxes, that is, the waxy product obtained directly from a solvent dewaxing process, e.g., an MEK or propane dewaxing process. The slack wax, which is a solid to semi-solid product, comprising mostly highly waxy paraffins (mostly n- and mono-methyl paraffins) together with occluded oil, may be fed directly to the first step of the present processing sequence as described below without the requirement for any initial preparation, for example, by hydrotreating.

The compositions of some typical waxes are given in Table 1 below.

TABLE 1

| Wax Composition - Arab Light Crude | | | | |
|---|---|---|---|---|
| | A | B | C | D |
| Paraffins, wt. % | 94.2 | 81.8 | 70.5 | 51.4 |
| Mono-naphthenes, wt. % | 2.6 | 11.0 | 6.3 | 16.5 |
| Poly-naphthenes, wt. % | 2.2 | 3.2 | 7.9 | 9.9 |
| Aromatics, wt. % | 1.0 | 4.0 | 15.3 | 22.2 |

A typical slack wax feed has the composition shown in Table 2 below. This slack wax is obtained from the solvent (MEK) dewaxing of a 300 SUS (65 cst) neutral oil obtained from an Arab Light crude.

TABLE 2

Slack Wax Properties

| | |
|---|---|
| ApI | 39 |
| Hydrogen, wt. % | 15.14 |
| Sulfur, wt. % | 0.18 |
| Nitrogen, ppmw | 11 |
| Melting Point, °C. (°F.) | 57 (135) |
| KV @ 100° C., cst | 5.168 |
| PNA, wt %: | |
| Paraffins | 70.3 |
| Naphthenes | 13.6 |
| Aromatics | 16.3 |

Simulated Distillation:

| % | °C. | (°F.) |
|---|---|---|
| 5 | 375 | (710) |
| 10 | 413 | (775) |
| 30 | 440 | (825) |
| 50 | 460 | (860) |
| 70 | 482 | (900) |
| 90 | 500 | (932) |
| 95 | 507 | (945) |

Another slack wax suitable for use in the present process has the properties set out in Table 3 below. This wax is prepared by the solvent dewaxing of a 450 SUS (100 cS) neutral raffinate:

TABLE 3

Slack Wax Properties

| | |
|---|---|
| Boiling Range, °F. | 736-1095 |
| API | |
| Nitrogen, ppm | 32 |
| Sulfur, wt. % | .10 |
| Hydrogen, wt. % | |
| KV @ 100° C., cst | 7.3 |
| Oil Content, wt. % (D3235) | 34 |

Simulated Distillation:

| wt. % | °F. | (°C.) |
|---|---|---|
| IBP (Initial Boiling Point) | 736 | (391) |
| 5 | 805 | (429) |
| 50 | 916 | (491) |
| 95 | 1037 | (558) |
| EP (End Point) | 1095 | (591) |

FIRST STAGE HYDROPROCESSING-HYDROCRACKING

The waxy feed is subjected to a two-step hydrocracking-hydroisomerization process in which both steps are normally carried out in the presence of hydrogen. In the first step, an amorphous bifunctional catalyst is used to promote the saturation and ring opening of the low quality aromatic components in the feed to produce hydrocracked products which are relatively more paraffinic. This stage is carried out under high pressure to favor aromatics saturation but the conversion is maintained at a relatively low level in order to minimize cracking of the paraffinic components of the feed and of the products obtained from the saturation and ring opening of the aromatic materials. Consistent with these process objectives, the hydrogen pressure in the first stage is at least 800 psig and usually is in the range of 1,000 to 3,000 psig. Normally, hydrogen partial pressures of at least 1500 psig are best in order to obtain a high level of aromatic saturation with pressures in the range of 1500 to 2500 psig being suitable for most high pressure equipment. Hydrogen circulation rates of at least about 1000 SCF/BBL, preferably in the range of 5,000 to 10,000 SCF/BBL are suitable.

In this stage of the process, the conversion of the feed to products boiling below the lube boiling range, typically to 650° F.— (about 345° C.—) products is limited to no more than 50 weight percent of the feed and will usually be not more than 30 weight percent of the feed in order to maintain the desired high single pass yields which are characteristic of the process while preparing the feed for the second stage of the processing; an initial V.I. for the first stage product of at least about 130 is normally desirable for the final product to have the desired V.I. of 140 or higher. The actual conversion is, for this reason, dependant on the quality of the feed with slack wax feeds requiring a lower conversion than petrolatums where it is necessary to remove more low quality polycyclic components. With slack wax feeds derived from the dewaxing of neutral stocks, the conversion (650° F.+) will, for all practical purposes not be greater than 10 to 20 weight percent, with about 15 weight percent being typical for heavy neutral slack waxes. Higher conversions may be encountered with petrolatum feeds in order to prepare the feed for the second stage processing. With petrolatum feeds, the first stage conversion will typically be in the range of 20 to 25 weight percent for high V.I. products. The conversion may be maintained at the desired value by control of the temperature in this stage which will normally be in the range 600° to 800° F. (about 315° to 430° C.) and more usually in the range of about 650° to 750° F. (about 345° to 400° C.). Space velocity variations may also be used to control severity although this will be less common in practice in view of mechanical constraints on the system.

The exact temperature selected to achieve the desired conversion will depend on the characteristics of the feed and of the catalyst as well as upon the extent to which it is necessary to remove the low quality aromatic components from the feed. In general terms, higher severity conditions are required for processing the more aromatic feeds up to the usual maximum of about 30 percent aromatics, than with the more paraffinic feeds. Thus, the properties of the feed should be correlated with the activity of the selected catalyst in order to arrive at the required operating temperature for the first stage in order to achieve the desired product properties, with the objective at this stage being to remove the undesirable, low quality aromatic components by hydrocracking while minimizing conversion of the more desirable paraffinic components to products boiling below the lube boiling range. In order to achieve the desired severity in this stage, temperature may also be correlated with the space velocity although for practical reasons, the space velocity will normally be held at a fixed value in accordance with mechanical and other constraints such as minimizing pressure drop. Generally, the space velocity will be in the range of 0.25 to 2 LHSV, hr$^{-1}$ and usually in the range of 0.5 to 1.5 LHSV.

A characteristic feature of the first stage operation is the use of a bifunctional lube hydrocracking catalyst. Catalysts of this type have a high selectivity for aromatics hydrocracking reactions in order to remove the low quality aromatic components from the feed. In general terms, these catalysts include a metal component for promoting the desired aromatics saturation reactions and usually a combination of base metals is used, with one metal from the iron group (Group VIII) in combination with a metal of Group VIB. Thus, the base metal such as nickel or cobalt is used in combination with molybdenum or tungsten. The preferred combination is nickel/tungsten since it has been found to be highly effective for promoting the desired aromatics hydrocracking reaction. Noble metals such as platinum or palladium may be used since they have good hydrogenation activity in the absence of sulfur but they will normally not be preferred. The amounts of the metals present on the catalyst are conventional for lube hydrocracking catalysts of this type and generally will range from 1 to 10 weight percent of the Group VIII metal and 10 to 30 weight percent of the Group VI metal, based on the total weight of the catalyst. If a noble metal component such as platinum or palladium is used instead of a base metal such as nickel or cobalt, relatively lower amounts are in order in view of the higher hydrogenation activities of these noble metals, typically from about 0.5 to 5 weight percent being sufficient. The metals may be incorporated by any suitable method including impregnation onto the porous support after it is formed into particles of the desired size or by addition to a gel of the support materials prior to calcination. Addition to the gel is a preferred technique when relatively high amounts of the metal components are to be added e.g., above 10 weight percent of the Group VIII metal and above 20 weight percent of the Group VI metal. These techniques are conventional in character and are employed for the production of lube hydrocracking catalysts.

The metal component of the catalyst is supported on a porous, amorphous metal oxide support and alumina is preferred for this purpose although silica-alumina may also be employed. Other metal oxide components may also be present in the support although their presence is less desirable. Consistent with the requirements of a lube hydrocracking catalyst, the support should have a pore size and distribution which is adequate to permit the relatively bulky components of the high boiling feeds to enter the interior pore structure of the catalyst where the desired hydrocracking reactions occur. To this extent, the catalyst will normally have a minimum pore size of about 50 Å i.e with no less than about 5 percent of the pores having a pore size less than 50 Å pore size, with the majority of the pores having a pore size in the range of 50–400 Å (no more than 5 percent having a pore size above 400 Å), preferably with no more than about 30 percent having pore sizes in the range of 200–400 Å. Preferred catalysts having the first stage have at least 60 percent of the pores in the 50–200 Å range. The pore size distribution and other properties of some typical lube hydrocracking catalysts suitable for use in the first stage are shown in Table 4 below:

TABLE 4

| Form | LHDC Catalyst Properties | | |
|---|---|---|---|
| | 1.5 mm cyl. | 1.5 mm. tri. | 1.5 mm. cyl. |
| Pore Volume, cc/gm | 0.331 | 0.453 | 0.426 |
| Surface Area, m²/gm | 131 | 170 | 116 |
| Nickel, wt. % | 4.8 | 4.6 | 5.6 |
| Tungsten, wt. % | 22.3 | 23.8 | 17.25 |
| Fluorine, wt. % | — | — | 3.35 |
| Silica, wt. % | — | — | 2 |
| Alumina, wt. % | — | — | 60.3 |
| Real Density, gm/cc | 4.229 | 4.238 | 4.023 |
| Particle Density, gm/cc | 1.744 | 1.451 | 1.483 |
| Packing Density, gm/cc | 1.2 | 0.85 | 0.94 |

If necessary in order to obtain the desired conversion, the catalyst may be promoted with fluorine, either by incorporating fluorine into the catalyst during its preparation or by operating the hydrocracking in the presence of a fluorine compound which is added to the feed. Fluorine compounds may be incorporated into the catalyst by impregnation during its preparation with a suitable fluorine compound such as ammonium fluoride ($NH_4F$) or ammonium bifluoride ($NH_4F \cdot HF$) of which the latter is preferred. The amount of fluorine used in catalysts which contain this element is preferably from about 1 to 10 weight percent, based on the total weight of the catalyst, usually from about 2 to 6 weight percent. The fluorine may be incorporated by adding the fluorine compound to a gel of the metal oxide support during the preparation of the catalyst or by impregnation after the particles of the catalyst have been formed by drying or calcining the gel. If the catalyst contains a relatively high amount of fluorine as well as high amounts of the metals, as noted above, it is preferred to incorporate the metals and the fluorine compound into the metal oxide gel prior to drying and calcining the gel to form the finished catalyst particles.

The catalyst activity may also be maintained at the desired level by in situ fluoriding in which a fluorine compound is added to the stream which passes over the catalyst in this stage of the operation. The fluorine compound may be added continuously or intermittently to the feed or, alternatively, an initial activation step may be carried out in which the fluorine compound is passed over the catalyst in the absence of the feed e.g., in a stream of hydrogen in order to increase the fluorine content of the catalyst prior to initiation of the actual hydrocracking. In situ fluoriding of the catalyst in this way is preferably carried out to induce a fluorine content of about 1 to 10 percent fluorine prior to operation, after which the fluorine can be reduced to maintenance levels sufficient to maintain the desired activity. Examples of suitable compounds for in situ fluoriding are orthofluorotoluene and difluoroethane.

The metals present on the catalyst are preferably used in their sulfide form and to this purpose pre-sulfiding of the catalyst should be carried out prior to initiation of the hydrocracking. Sulfiding is an established technique and it is typically carried out by contacting the catalyst with a sulfur-containing gas, usually in the presence of hydrogen. The mixture of hydrogen and hydrogen sulfide, carbon disulfide or a mercaptan such as butyl mercaptan is conventional for this purpose. Presulfiding may also be carried out by contacting the catalyst with hydrogen and a sulfur-containing hydrocarbon oil such as a sour kerosene or gas oil.

Because the feeds are highly paraffinic, the heteroatom content is low and accordingly the feed may be passed directly into the first process step, without the necessity of a preliminary hydrotreatment.

Hydroisomerization

During the first stage of the process, the low quality, relatively aromatic components of the feed are converted by hydrocracking to products which are relatively more paraffinic in character by saturation and ring opening. The paraffinic materials present in the stream at this stage of the process possess good V.I. characteristics but have relatively high pour points as a result of their paraffinic nature. The objective in the second stage of the process is to effect a selective hydroisomerization of these paraffinic components to isoparaffins which, while possessing good viscometric properties, also have lower pour points. This enables the pour point of the final product to be obtained without an excessive degree of dewaxing following the hydroisomerization. Because the low quality aromatic components have been removed by the initial hydrocracking step, there is no requirement for achieving any significant degree of aromatic saturation in the second stage of the operation so that it is possible to carry it out under lower pressures, typically in the range of about 200 to 1000 psig although pressures from about 400 to 1000 psig are more typical. In the low pressure mode of operation, it is preferred to operate the second stage with hydrogen partial pressures from at least 200 psig.

Another mode of operation is with higher hydrogen pressures in the second stage, typically over 1000 psig (about 7000 kPa). This mode of operation is preferred as it retains all aromatic saturation accomplished in the first step and since the second stage can be operated in cascade with the first stage, at an inlet pressure equal to the outlet pressure of the first stage.

In the preferred modes of operation, therefore, the second stage will operate at a hydrogen partial pressure of 400 to 1000 psig in the low pressure mode or at hydrogen partial pressures of 1000 to 3000 psig, usually 1500-2500 psig in the high pressure mode. Hydrogen circulation rates are comparable to those used in the first stage.

The catalyst used in the second stage is one which has a high selectivity for the isomerization of waxy, linear or near linear paraffins to less waxy, isoparaffinic products. Catalysts of this type are bifunctional in character, comprising a metal component on a large pore size, porous support of relatively low acidity. The acidity is maintained at a low level in order to reduce conversion to products boiling outside the lube boiling range during this stage of the operation. In general terms, an Alpha Value below 25 should be employed, with preferred values below 15, best results being obtained with Alpha Values below 10.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016sec$^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395. For the bifunctional catalysts used in this stage of the present process, the Alpha Value is determined in the absence of the metal component.

The support material for the paraffin hydroisomerization catalyst is a highly siliceous zeolite, including zeolite beta and mordenite, in a form which has the required low level of acid activity to minimize paraffin cracking and to maximize paraffin isomerization. Low acidity values in the zeolite may be obtained by use of a sufficiently high silica:alumina ratio in the zeolite, achievable by the use of a dicarboxylic acid treatment to reduce the acidity of the zeolite. Steaming may also be utilized to further reduce the acidity of the zeolite.

Zeolite Beta is a preferred support since this zeolite has been shown to possess outstanding activity for paraffin isomerization in the presence of aromatics, as disclosed in U.S. Pat. No. 4,419,220. Zeolite Beta is described in U.S. Pat. Nos. 3,308,069 and Re 28,341, incorporated herein by reference.

Suitable dicarboxylic acids for use in the process of this invention include oxalic, malonic, succinic, glutaric, adipic, maleic, phthalic, isophthalic, terephthalic, fumaric, tartaric, or mixtures thereof. Oxalic acid is preferred. The dicarboxylic acid may be used in solution, such as an aqueous dicarboxylic acid solution.

Generally, the acid solution has a concentration in the range from about 0.01 to about 4 M. Preferably, the acid solution concentration is in the range from about 1 to about 3 M.

The dicarboxylic acid is generally in a volume solution to volume catalyst ratio of at least about 1:1, preferably at least about 4:1.

Treatment time with the dicarboxylic acid solution is as long as required to provide the desired dealumination. Generally, the treatment time is at least about 10 minutes. Preferably, the treatment time is at least about 1 hour.

More than one dicarboxylic acid treatment step may be employed for enhanced dealumination.

The dicarboxylic treatment temperature is generally in the range of from about 32° F. (about 0° C.) to about reflux. Preferably, the treatment temperature is from about 60° F. to about 200° F. (about 15° to about 94° C.), and more preferably from about 120° F. to about 180° F. (about 48° to about 82° C.).

The dicarboxylic acid treatment results in a dealuminated zeolite having a lower acidic activity than the starting materials, since acidity is related to the number of sites available for protonation and removal of aluminum reduces the proportion of these sites. The dicarboxylic acid treatment results in the production of dealuminated zeolite Beta having an Alpha Value below about 25, preferably below about 15, more preferably no greater than 10, and even more preferably no greater than 5.

The dicarboxylic acid treatment may also be combined with other conventional dealumination techniques, such as steaming and chemical treatment.

In a further embodiment, the dicarboxylic acid treatment is combined with steaming to obtain a low acidity mordenite. The crystal structure, X-ray diffraction pattern and other properties of mordenite are described in pertinent portions (e.g., p. 231) of *Zeolite Molecular Sieves* by Donald W. Breck, published by John Wiley, New York, NY (1974), incorporated herein by reference.

Steam treatment may be done prior to, concurrent with or after dicarboxylic acid treatment. Steam treatment after dicarboxylic acid treatment is preferred.

The zeolite sample is exposed to 100% steam at a partial pressure in the range of from about 0.1 to about 10 atm and preferably in the range of from about 0.5 to about 2 atm, and at a temperature in the range of from about 600° to about 1200° F. (about 315° to about 648° C.) and preferably in the range of from about 900° to about 1100° F. (about 482° to about 593° C.).

Steaming is generally for as long as required to provide the desired dealumination. The steam treatment is at least about 1 hour. Preferably, the steam treatment time is at least about 3 hours and more preferably at least about 10 hours.

The zeolite may be contacted with steam and dicarboxylic acid in multiple alternate cycles of steaming and acid treatment until the desired dealumination is achieved.

More than one acid treatment step may be employed in conjunction with steaming for enhanced dealumination.

The dicarboxylic acid/steam treatment results in the production of dealuminated mordenite having an Alpha Value below about 25, preferably below about 15, and more preferably below about 10.

The dicarboxylic acid/steam treatment may also be combined with other conventional dealumination techniques, such as chemical treatment.

Prior to or following dicarboxylic acid treatment, the zeolite will be composited with a matrix material to form the finished catalyst and for this purpose conventional non-acidic matrix materials such as alumina, silica-alumina and silica are suitable with preference given to silica as a non-acidic binder, although non-acidic aluminas such as alpha boehmite (alpha alumina monohydrate) may also be used, provided that they do not confer any substantial degree of acidic activity on the matrixed catalyst. The use of silica as a binder is preferred since alumina, even if non-acidic in character, may tend to react with the zeolite under hydrothermal reaction conditions to enhance its acidity. The zeolite is usually composited with the matrix in amounts from 80:20 to 20:80 by weight, typically from 80:20 to 50:50 zeolite:matrix. Compositing may be done by conventional means including mulling the materials together followed by extrusion of pelletizing into the desired finished catalyst particles. A preferred method for extruding the zeolite with silica as a binder is disclosed in U.S. Pat. No. 4,582,815. If the catalyst is to be steamed in order to achieve the desired low acidity, it is performed after the catalyst has been formulated with the binder, as is conventional.

The second stage catalyst also includes a metal component in order to promote the desired hydroisomerization reactions which, proceeding through unsaturated transitional species, require mediation by a hydrogenation-dehydrogenation component. In order to maximize the isomerization activity of the catalyst, metals having a strong hydrogenation function are preferred and for this reason, platinum and the other noble metals such as palladium are given a preference. The amount of the noble metal hydrogenation component is typically in the range 0.5 to 5 weight percent of the total catalyst, usually from 0.5 to 2 weight percent. The platinum may be incorporated into the catalyst by conventional techniques including ion exchange with complex platinum cations such as platinum tetraammine or by impregnation with solutions of soluble platinum compounds, for example, with platinum tetraammine salts such as platinum tetraamminechloride. The catalyst may be subjected to a final calcination under conventional conditions in order to convert the noble metal to the oxide form and to confer the required mechanical strength on the catalyst. Prior to use the catalyst may be subjected to presulfiding as described above for the first stage catalyst.

The objective in the second stage is to isomerize the waxy, linear and near-linear paraffinic components in the first stage effluent to less waxy but high V.I. isoparaffinic materials of relatively lower pour point. The conditions in the second stage are therefore adjusted to achieve this end while minimizing conversion to non-lube boiling range products (usually 650° F.—(345° C.—) materials). Since the catalyst used in this stage has a low acidity, conversion to lower boiling products is usually at a relatively low level and by appropriate selection of severity, second stage operation may be optimized for isomerization over cracking. At conventional space velocities of about 1, using a Pt/dicarboxylic acid-treated zeolite Beta catalyst with an Alpha Value of about 5, temperatures in the second stage will typically be in the range of about 550° to about 700° F. (about 290° to 370° C.) and usually in the range of about 575° to about 675° F. (about 302° to about 357° C.) with 650° F.+ conversion typically being from about 10 to 30 weight percent, more usually 12 to 20 weight percent, of the second stage feed. However, temperatures may be used outside this range, for example, as low as about 500° F. (260° C.) up to about 750° F. (about 400° C.) although the higher temperatures will usually not be preferred since they will be associated with a lower isomerization selectivity and the production of less stable lube products as a result of the hydrogenation reactions being thermodynamically less favored at progressively higher operating temperatures. With the increased activity resulting from the use of high hydrogen pressures in the high pressure mode, temperatures in the second stage may be somewhat lower than those appropriate to low pressure operation; in the high pressure mode, temperatures of 550° to 700° F. (about 290° to 370° C.) will be preferred, as compared to the preferred range of 600° to 700° F. (about 315° to 370° C.) for this stage of the operation in the low pressure mode. Space velocities will typically be in the range of 0.5 to 2 LHSV ($hr^{-1}$) although in most cases a space velocity of about 1 LHSV will be most favorable. Hydrogen circulation rates are comparable to those used in the first step, as described above; but since there is much lower hydrogen consumption, lower circulation rates may be employed if feasible. In the cascade operational mode, the excess hydrogen from the first stage will be found adequate for the second stage operation.

A particular advantage of the present process is that it enables a functional separation to be effected in the entire operating scheme. In the first stage, the undesirable low V.I. components are removed by a process of saturation and ring opening under conditions of high pressure and relatively high temperature. By contrast, the second stage is intended to maximize the content of iso-paraffins in the product and because the low V.I. materials have been dealt with in the first stage, can be optimized to effect a selective isomerization of the paraffinic materials. The low temperature conditions which are appropriate for the paraffin isomerization limit the cracking reactions as noted above but are thermodynamically favorable for the saturation of any lube range olefins which may be formed by cracking reactions, particularly in the presence of the highly active hydrogenation components on the catalyst. In this way, the second stage is also effective for hydrofinishing the product so that product stability is improved, especially stability to ultraviolet radiation, a property which is frequently lacking in conventional hydrocracked lube products. The hydrofinishing is particularly effective when the second step is carried out under high hydrogen partial pressures e.g., over about 1000 psig (about 7000 kPa). The isomerized product may therefore be subjected simply to a final dewaxing step in order to achieve the desired target pour point and usually there will be no need for any further finishing steps since a low unsaturates content, both of aromatics and of lube range olefins, results from the optimized processing in the two functionally separated steps of the process. The product may therefore be subjected to a final fractionation to remove lower boiling materials, followed by a final dewaxing step in order to achieve target pour point for the product.

Dewaxing

Although a final dewaxing step will normally be necessary in order to achieve the desired product pour point, it is a notable feature of the present process that the extent of dewaxing required is relatively small. Typically, the loss during the final dewaxing step will be no more than 15 to 20 weight percent of the dewaxer feed and may be lower. Either catalytic dewaxing or solvent dewaxing may be used at this point and if a solvent dewaxer is used, the removed wax may be recycled to the first or second stages of the process for further treatment. Since the wax removed in a solvent dewaxer is highly paraffinic, it may be recycled directly to the second stage if this is feasible, for example, in the embodiment where the second stage is operated at a relatively low pressure.

The preferred catalytic dewaxing processes utilize an intermediate pore size zeolite such as ZSM-5, but the most preferred dewaxing catalysts are based on the highly constrained intermediate pore size zeolites such as ZSM-22, ZSM-23 or ZSM-35, since these zeolites have been found to provide highly selective dewaxing, giving dewaxed products of low pour point and high V.I. Dewaxing processes using these zeolites are described in U.S. Pat. Nos. 4,222,855. The zeolites whose use is preferred here may be characterized in the same way as described in U.S. Pat. No. 4,222,855, i.e., as zeolites having pore openings which result in the possession of defined sorption properties set out in the patent, namely, (1) a ratio of sorption of n-hexane to o-xylene, on a volume percent basis, of greater than about 3, which sorption is determined at a $P/P_o$ of 0.1 and at a temperature of 50° C. for n-hexane and 80° C. for o-xylene and (2) by the ability of selectively cracking 3-methylpentane (3MP) in preference to the doubly branched 2,3-dimethylbutane (DMB) at 1000° F. and 1 atmosphere pressure from a 1/1/1 weight ratio mixture of n-hexane/3-methyl-pentane/2,3-dimethylbutane, with the ratio of rate constants $k_{3MP}/k_{DMB}$ determined at a temperature of 1000° F. being in excess of about 2 The expression, "$P/P_o$" is accorded its usual significance as described in the literature, for example, in *The Dynamical Character of Adsorption* by J.H. deBoer, 2nd ed., Oxford University Press (1968) and is the relative pressure defined as the ratio of the partial pressure of sorbate to the vapor pressure of sorbate at the temperature of sorption. The ratio of the rate constants, $k_{3MP}/k_{DMB}$, is determined from 1st order kinetics, in the usual manner, by the following equation:

$$k=(1/T_c)\ln(1/1-e)$$

where k is the rate constant for each component, $T_c$ is the contact time and e is the fractional conversion of each component.

Zeolites conforming to these sorption requirements include the naturally occurring zeolite ferrierite as well as the known synthetic zeolites ZSM-22, ZSM-23 and ZSM-35. These zeolites are at least partly in the acid or hydrogen form when they are used in the dewaxing process and a metal hydrogenation component, preferably a noble metal such as platinum is preferable used. Excellent results have been obtained with a Pt/ZSM-23 dewaxing catalyst.

The preparation and properties of zeolites ZSM-22, ZSM-23 and ZSM-35 are described respectively in U.S. Pat. Nos. 4,810,357 (ZSM-22); 4,076,842 and 4,104,151 (ZSM-23) and 4,016,245 (ZSM-35), to which reference is made for a description of this zeolite and its preparation. Ferrierite is a naturally-occurring mineral, described in the literature, see, e.g., Breck, *Zeolite Molecular Sieves,* pages 125–127; 146; 219; and 625, to which reference is made for a description of this zeolite.

In any event, however, the demands on the dewaxing unit for the product are relatively low and in this respect the present process provides a significant improvement over the process employing solely amorphous catalysts where a significant degree of dewaxing is required. The functional separation inherent in the process enable higher single pass wax conversions to be achieved, typically about 70 to 80% as compared to 50% for the amorphous catalyst process so that unit throughput is significantly enhanced with respect to the conventional process. Although conversions levels above 80 percent may be employed so that the load on the dewaxer is reduced, the product V.I. and yield decrease at the same time and generally, the final dewaxing stage cannot be completely eliminated unless products with a V.I. below about 135 are accepted.

Products

The products from the process are high V.I., low pour point materials which are obtained in excellent yield. Besides having excellent viscometric properties they are also highly stable, both oxidatively and thermally and to ultraviolet light. V.I. values in the range of 140 to 155 are typically obtained, with values of 143 to 147 being readily achievable with product yields of at least 50 weight percent, usually at least 60 weight percent, based on the original wax feed, corresponding to wax conversion values of almost 80 and 90 percent, respectively. Another notable feature of the process is that the products retain desirable viscosity values as a result of the limited boiling range conversions which are inherent in the process: conversely, higher yields are obtained at constant product viscosity.

Examples

The following examples are given in order to illustrate various aspects of the present process. Examples 1 and 2, directly following, illustrate the preparation of dicarboxylic acid-treated Pt/zeolite Beta and Pt/mordenite catalysts for hydroisomerization.

EXAMPLE 1

65 parts by weight on a dry basis of TEA mordenite, prepared in accordance with U.S. Pat. No. 4,052,472, incorporated herein by reference, is mixed with 35 parts by weight on a dry basis of commercial silica (Ultrasil). The material is extruded to form 1/16" cylindrical pellets. The pellets are ammonium exchanged and calcined at 1000° F. for 3 hours in air.

The calcined extrudate is slurried with 8 cc oxalic acid/cc catalyst of a 2.0 M oxalic acid solution at 180° F. for 2 hours. The oxalic acid-treated catalyst is dried at 250° F. for 8 hours and calcined in air for 3 hours at 1000° F. The oxalic acid treatment results in mordenite having an Alpha Value of 133. The oxalic acid-treated catalyst is then exposed to 100% steam, 0 psig at 1025° F. for 24 hours. The oxalic acid/steam treatment results in mordenite having an Alpha Value of 11.

The oxalic acid/steam-treated mordenite is competitively ion exchanged with $Pt(NH_3)_4Cl_2.H_2O$ in a 0.05 N $NH_4NO_3$ solution at a pH of 7. The exchanged catalyst is washed with distilled water and air calcined at 660° F. for 3 hours. The finished catalyst has the properties shown in Table 5.

EXAMPLE 2

Zeolite Beta, prepared in accordance with U.S. Pat. Nos. 3,308,069 and Re 28,341, incorporated herein by reference, is exchanged with a solution of $NH_4NO_3$ to remove sodium and dried at 250° F. for 8 hours. Sixty-five parts by weight on a dry basis of the above zeolite Beta is mixed with 35 parts by weight on a dry basis of silica and extended into 1/16" pellets. The pellets are dried at 250° F. for 8 hours. Organics are removed by first treating in $N_2$ at 950° F. for 3 hours followed by air calcination at 1000° F. for 6 hours. The calcined extrudate is treated with a 2M solution of oxalic acid at a volume ratio of solution to catalyst of 8 to 1. Treatment is conducted at 160° F. for 6 hours. The treated catalyst is dried at 250° F. overnight. The dried material is air calcined at 1000° F. for 3 hours. The treatment results in zeolite Beta having an Alpha Value of 8.

The oxalic acid-treated zeolite Beta catalyst is exchanged with a solution of $Pt(NH_3)_4Cl_2.H_2O$ in water at a pH of 4. The exchanged catalyst is washed with distilled water and air calcined at 660° F. for 3 hours. The finished catalyst has the properties shown in Table 5.

TABLE 5

| | Oxalic Acid/Steam-Treated Mordenite | Oxalic Acid-Treated Zeolite Beta |
|---|---|---|
| Platinum, wt. % | 0.43 | 0.48 |
| Surface area, m²/g | 267 | 316 |
| Pore Volume, cc/g | 0.69 | 0.74 |
| Particle Density, g/cc | 0.89 | 0.98 |

EXAMPLE 3

A high boiling point heavy neutral slack wax with the properties shown in Table 3 and containing 34 wt. % oil as measured by ASTM D3235 is processed by hydrocracking over a NiW/fluorided catalyst described in Table 4, second column. The catalyst is sulfided and fluorided in-situ using o-fluorotoluene at a level of 600 ppm fluorine for one week at a temperature of 725° F. before introducing the slack wax. The hydrocracking is carried out with fluorine maintenance at 25 ppm F using o-fluorotoluene under the following conditions:

| LHSV, hr$^{-1}$ | 1 |
|---|---|
| Pressure, psig | 2000 |
| H$_2$ circulation, SCF/BBL | 5000 |

The reaction severity is adjusted by varying the reaction temperature from 720° to 770° F. which results in wax conversion of 40 to 75 wt. %. Wax conversion is defined as follows:

$$\text{Wax conversion} = \frac{(\text{Wax in oil feed} - \text{wax obtained by solvent dewaxing})}{\text{Wax in Oil Feed}}$$

Total liquid product (TLP) is obtained from the mild hydrocracking of the heavy neutral slack. This material has the properties listed in Table 6.

TABLE 6

| Hydrocracked Slack Wax Properties | |
|---|---|
| Boiling Range, °F. | 370–1070 |
| Hydrogen, wt. % | 14.87 |
| Nitrogen, ppm | 5.0 |
| Sulfur, wt. % | .008 |
| API | 37.6 |
| KV @ 100° C., cst | 5.157 |
| Pour Point, °F. | >120 |
| Simulated Distillation: | |
| wt. % | °F. |
| IBP (Initial Boiling Point) | 370 |
| 5 | 521 |
| 50 | 872 |
| 95 | 1018 |
| EP (End Point) | 1070 |

EXAMPLE 4

A sample of the TLP material of Example 3 is processed over the oxalic acid-treated mordenite catalyst of Example 1 under the follow conditions:

| LHSV, hr$^{-1}$ | 1.0 |
|---|---|
| Pressure, psig | 2000 |
| H$_2$ circulation, SCF/BBL | 5000 |
| Temperature, °F. | 614 to 670 |

The waxy product is then distilled to a nominal 650° F.+ cut-point. The distilled material is subsequently dewaxed using a conventional MEK/toluene process. The results are given in Table 7 below.

EXAMPLE 5

A sample of the TLP material of Example 3 is processed over the oxalic acid-treated zeolite Beta catalyst of Example 2 under the following conditions:

| LHSV, hr$^{-1}$ | 1.25 |
|---|---|
| Pressure, psig | 2000 |
| H$_2$ circulation, SCF/BBL | 4000 |
| Temperature, °F. | 585 to 635 |

The waxy product is then distilled to a nominal 650° F.+ cut-point. The distilled material is subsequently dewaxed using a conventional MEK/toluene process.

Table 7 summarizes the yield and product property data for the oxalic acid-treated catalysts. Yield is determined by the amount of lube material remaining after solvent dewaxing and is based on the feed to the hydrocracker in Example 3.

FIG. 1 compares the lube yield versus wax conversion for the products of Examples 3, 4 and 5. The Figure shows that the two-step processing of Examples 4 and 5 using oxalic acid-treated catalysts achieves a higher maximum lube yield of about 54 to about 62 wt. % in comparison to a maximum lube yield of about 40 to about 42 wt. % for the single-stage process of Example 3.

FIG. 2 shows the Viscosity Index (V.I.) of the product obtained versus wax conversion. The V.I. of the products obtained from the oxalic acid-treated catalysts is above the desirable V.I. target of greater than about 130.

FIG. 3 shows the relationship between the kinematic viscosity (@100° C.) of the product at varying wax conversions for Examples 3, 4 and 5. The Figure shows that at a given wax conversion the oxalic acid-treated catalysts produce a basestock with about a 0.5–1.0 cst higher viscosity. The process of Examples 4 and 5 enables viscosity to be retained to a greater degree than with the single-stage process of Example 3 as a result of the selective conversion of wax to high V.I. oil without excessive conversion of oil out of the lube boiling range. This valuable feature enables products of varying viscosities to be manufactured by suitable selection of conditions. Further, higher wax conversion is achieved at the same viscosity with the oxalic acid-treated catalyst. Higher wax conversion is desirable to reduce the load on the downstream solvent dewaxing unit. Higher viscosity is desirable because viscosity reduction when the slack wax is hydroprocessed is minimized in the runs of Examples 4 and 5 compared to the Example 3 run.

TABLE 7

| Isomerization of Low Conversion Hydrocracked | | | | | | |
|---|---|---|---|---|---|---|
| Run Number | 1 | 2 | 3 | 4 | 5 | 6 |
| Slack Wax Over Pt/Oxalic Acid-Treated Mordenite | | | | | | |
| Reactor Temp, °F. | 614 | 640 | 650 | 665 | 670 | |
| LHSV, hr$^{-1}$ | 1 | 1 | 1 | 1 | 1 | |
| Wax Conversion | 40 | 62.1 | 71.1 | 92.0 | 94.3 | |
| KV @ 100° C. | 6.03 | 5.40 | 5.21 | 5.36 | 5.32 | |
| V.I. | 142 | 141 | 142 | 142 | 137 | |
| Pour Point, °F. | 10 | −5 | 15 | 5 | 10 | |
| Lube Yield, wt. % | 39 | 51.3 | 54.4 | 45 | 44 | |
| Slack Wax Over Pt/Oxalic Acit-Treated Zeolite Beta | | | | | | |
| Reactor Temp, °F. | 615 | 620 | 630 | 635 | 610 | 585 |
| LHSV, hr$^{-1}$ | 1.25 | 1.25 | 1.25 | 1.25 | 1.25 | 1.25 |
| Wax Conversion | 87 | 90 | 96 | 99 | 84 | 20 |
| KV @ 100° C. | 5.17 | 5.10 | 5.02 | 4.91 | 5.17 | 6.11 |
| V.I. | 144 | 139 | 138 | 132 | 144 | 144 |
| Pour Point, °F. | 0 | +5 | 0 | 0 | 0 | 0 |
| Lube Yield, wt. % | 64 | 60 | 56 | 48 | 60 | 46 |

Changes and modifications in the specifically described embodiment can be carried out without departing from the scope of the invention which is intended to be limited only by the scope of the appended claims.

We claim:

1. A process for producing a high Viscosity Index lubricant having a Viscosity Index of at least 130 from a hydrocarbon feed of mineral oil origin having a wax content of at least 50 weight percent, which comprises:

(i) hydrocracking the feed at a hydrogen partial pressure of at least 800 psig over a bifunctional lube hydrocracking catalyst comprising a metal hydrogenation component on an acidic, amorphous, porous support material to hydrocrack aromatic components present in the feed at a severity which results in a conversion of not more than 50 weight percent of the feed to products boiling outside the lube boiling range;

(ii) isomerizing waxy paraffins present in the effluent from the hydrocracking step in the presence of a low acidity isomerization catalyst having an Alpha Value of not more than 25 and comprising a noble metal hydrogenation component on a porous support material comprising a dicarboxylic acid-treated zeolite selected from the group consisting of zeolite Beta and mordenite to isomerize waxy paraffins to less waxy isoparaffins.

2. The process according to claim 1 in which the feed comprises a petroleum wax having the wax content of at least 50 weight percent and an aromatic content of from 5 to 30 weight percent.

3. A process according to claim 2 in which the petroleum wax comprises a slack wax having an aromatic content of from 8 to 15 weight percent.

4. A process according to claim 1 in which the catalyst in the hydrocracking step comprises, as the metal component, at least one metal of Group VIII and at least one metal of Group VI of the Periodic Table.

5. A process according to claim 4 in which the hydrocracking catalyst comprises alumina as an acidic support material.

6. A process according to claim 1 in which the lube hydrocracking catalyst is a fluorided lube hydrocracking catalyst.

7. A process according to claim 6 in which the hydrocracking catalyst is a pre-fluorided lube hydrocracking catalyst pre-fluorided to a fluorine content of 1 to 10 weight percent fluorine.

8. A process according to claim 1 in which the conversion during the hydrocracking step to 650° F.− material is from 10 to 30 weight percent of the feed.

9. A process according to claim 1 in which the isomerization catalyst comprises a dicarboxylic acid/steam-treated mordenite isomerization catalyst having an Alpha Value not greater than 15.

10. A process according to claim 9 in which the isomerization catalyst comprises an oxalic acid/steam-treated mordenite isomerization catalyst.

11. A process according to claim 10 in which the isomerization catalyst comprises from 0.5 to 2 weight percent platinum on a support comprising oxalic acid/stream-treated mordenite.

12. A process according to claim 1 in which the isomerization catalyst comprises a dicarboxylic acid-treated zeolite Beta isomerization catalyst having an Alpha Value not greater than 10.

13. A process according to claim 12 in which the isomerization catalyst comprises a dicarboxylic acid-treated zeolite Beta isomerization catalyst having an Alpha Value of not greater than 8.

14. A process according to claim 12 in which the isomerization catalyst comprises an oxalic acid-treated zeolite Beta isomerization catalyst.

15. A process according to claim 14 in which the isomerization catalyst comprises from 0.5 to 2 weight percent platinum on a support comprising oxalic acid-treated zeolite Beta.

16. A process according to claim 1 in which the isomerization step is carried out in the presence of hydrogen at a pressure of at least 200 psig.

17. A process according to claim 1 in which the isomerization step is carried out in the presence of hydrogen at a conversion to 650° F.− product of not more than 30 weight percent, based on the feed to the isomerization step.

18. A process according to claim 17 in which the isomerization step is carried out at a temperature not greater than 650° F.

19. A process for producing a high Viscosity Index lubricant having a Viscosity Index of at least 130 from a petroleum wax feed having a wax content of at least 50 weight percent, which comprises:
  (i) hydrocracking the petroleum wax feed in a hydrocracking step in the presence of hydrogen at a pressure of at least 1000 psig in the presence of a hydrocracking catalyst comprising a metal hydrogenation component of at least one metal of Group VIII of the Periodic Table and at least one metal of Group VI of the Periodic Table on an amorphous, porous alumina support at a temperature of at least 650° F. and at a severity which results in a conversion to 650° F.— products of not more than 30 weight percent based on the petroleum wax feed,
  (ii) hydroisomerizing the effluent of the hydrocracking step in the presence of hydrogen at a hydrogen partial pressure of at least 1000 psig at a temperature from 550° to 700° F. and in the presence of a paraffin isomerization catalyst comprising a noble metal hydrogenation component on a low acidity support having an Alpha Value not greater than 10 and comprising a dicarboxylic acid-treated zeolite Beta, to produce a product having a Viscosity Index of at least 130.

20. A process according to claim 19 in which the effluent from the hydrocracking step is cascaded directly to the hydroisomerization step.

21. A process according to claim 19 in which the effluent from the hydrocracking step is treated to remove heteroatoms prior to being cascaded to the hydroisomerization step.

22. A process according to claim 19 in which the 650° F.+ conversion in the hydrocracking step is from 10 to 30 weight percent based on the petroleum wax feed.

23. A process according to claim 20 in which the hydrocracking step is carried out at a hydrogen partial pressure of 1500 to 2500 psig.

24. A process according to claim 19 in which the hydrocracking catalyst is a fluorided hydrocracking catalyst.

25. A process according to claim 19 in which the Alpha Value of the hydroisomerization catalyst is not greater than 5.

26. A process according to claim 19 in which the isomerization catalyst comprises a Pt/oxalic acid-treated zeolite Beta catalyst having an Alpha Value not greater than 5 and a platinum content from 0.5 to 1.5 weight percent based on the total weight of the catalyst.

27. A process according to claim 19 in which the isomerization step is carried out at a temperature from 575° to 675° F.

28. A process according to claim 19 in which the 650° F.— conversion during the isomerization step is from 10 to 20 weight percent based on the feed to the isomerization step.

29. A process according to claim 19 in which the hydroisomerized product is subjected to a dewaxing to achieve a target pour point, with a loss during the dewaxing of not more than 20 weight percent.

30. A process according to claim 19 in which the product has a V.I. of greater than 140.

31. A process for producing a high Viscosity Index lubricant having a Viscosity Index of at least 130 from a petroleum wax feed having a wax content of at least 50 weight percent, which comprises
  (i) hydrocracking the petroleum wax feed in a hydrocracking step in the presence of hydrogen at a pressure of at least 1000 psig in the presence of a hydrocracking catalyst comprising a metal hydrogenation component of at least one metal of Group VIII of the Periodic Table and at least one metal of Group VI of the Periodic Table on an amorphous, porous alumina support at a temperature of at least 650° F. and at a severity which results in a conversion to 650° F.— products of not more than 30 weight percent based on the petroleum wax feed;
  (ii) hydroisomerizing the product of the hydrocracking step in the presence of hydrogen at a hydrogen partial pressure from 200 to 1000 psig at a temperature from 600° to 700° F. and in the presence of a paraffin isomerization catalyst comprising a noble metal hydrogenation component on a low acidity support having an Alpha Value not greater than 10 and comprising a dicarboxylic acid-treaed zeolite Beta, to produce a product having a Viscosity Index of at least 130.

32. A process according to claim 31 in which the 650° F.+ conversion in the hydrocracking step is from 10 to 30 weight percent based on the petroleum wax feed.

33. A process according to claim 31 in which the hydrocracking step is carried out at a hydrogen partial pressure of 1500 to 2500 psig.

34. A process according to claim 31 in which the hydrocracking catalyst is a fluorided hydrocracking catalyst.

35. A process according to claim 31 in which the Alpha Value of the hydroisomerization catalyst is not greater than 5.

36. A process according to claim 31 in which the isomerization catalyst comprises a Pt/oxalic acid-treated zeolite Beta catalyst having an Alpha Value not greater than 5 and a platinum content of not less than 0.1 weight percent based on the total weight of the catalyst.

37. A process according to claim 31 in which the isomerization step is carried out at a temperature from 600° to 650° F.

38. A process according to claim 31 in which the 650° F.— conversion during the isomerization step is from 10 to 20 weight percent based on the feed to the isomerization step.

39. A process according to claim 31 in which the hydroisomerized product is subjected to a dewaxing to achieve a target pour point, with a loss during the dewaxing of not more than 20 weight percent.

* * * * *